July 9, 1963 L. J. RUISINGER 3,097,356
RADAR RECEIVER SYSTEM
Filed Nov. 18, 1958 3 Sheets-Sheet 1

INVENTOR.
LAURENCE J. RUISINGER
BY
Stevens, Davis, Miller & Mosher
ATTORNEYS

July 9, 1963   L. J. RUISINGER   3,097,356
RADAR RECEIVER SYSTEM
Filed Nov. 18, 1958   3 Sheets-Sheet 2
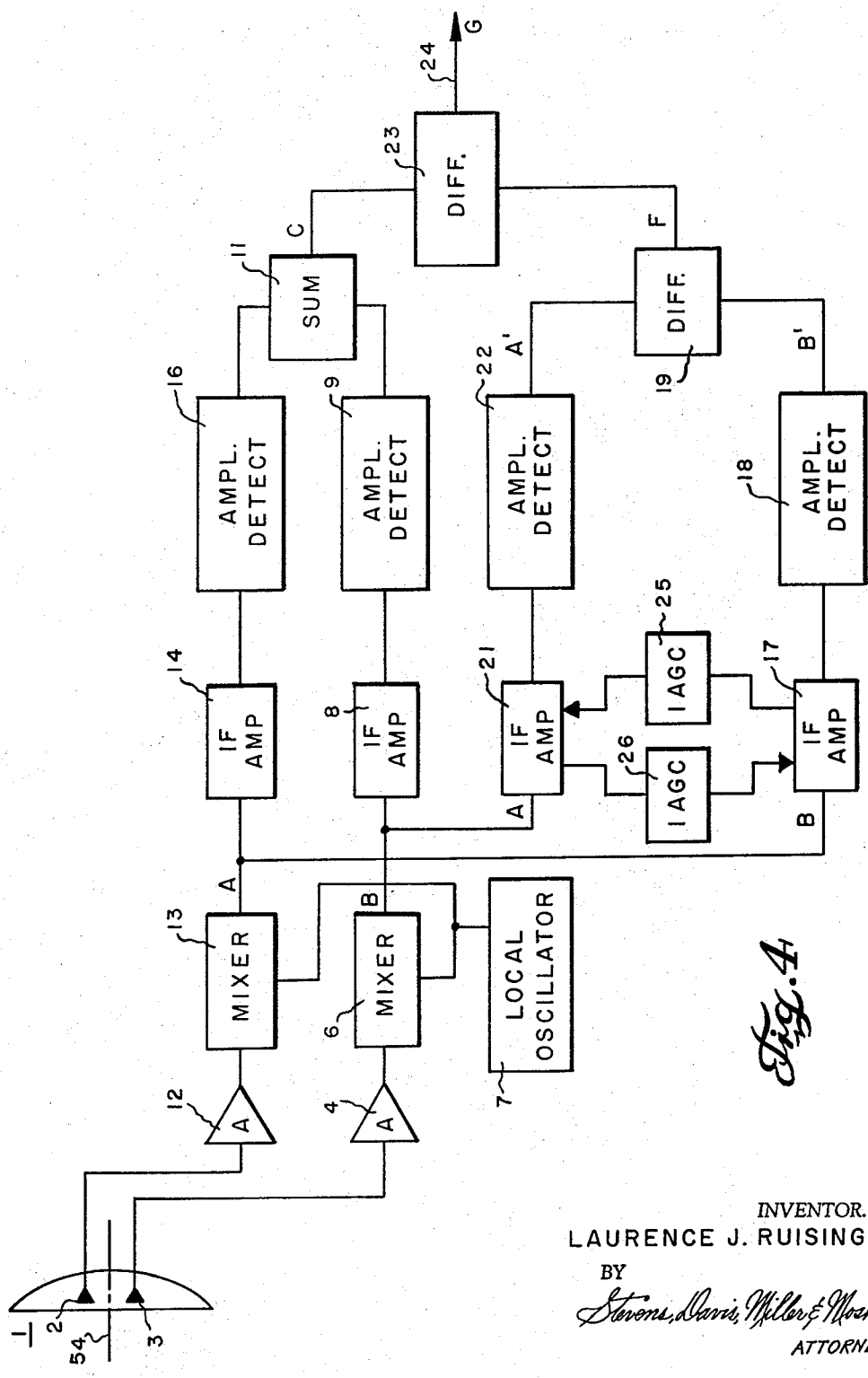
INVENTOR.
LAURENCE J. RUISINGER
BY
Stevens, Davis, Miller & Mosher
ATTORNEYS

INVENTOR.
LAURENCE J. RUISINGER

United States Patent Office 3,097,356
Patented July 9, 1963

3,097,356
RADAR RECEIVER SYSTEM
Laurence J. Ruisinger, Dallas, Tex., assignor to Texas Instruments Incorporated, Dallas, Tex., a corporation of Delaware
Filed Nov. 18, 1958, Ser. No. 774,698
10 Claims. (Cl. 343—100)

The present invention relates to receiving apparatus and more particularly to a radar receiving system for reducing the effective width of a beam of radiation intercepted by a radar antenna.

In recent years there has been considerable interest in reducing the effective width of a beam of radiation received by a radar antenna in order to increase the resolution of the display presented by the apparatus. Prior investigations in this field have led to the development of a technique known as the "monopulse resolution improvement" technique for reducing the effective width of the beam of radiation received by a radar antenna to approximately 2°. In accordance with this technique, an antenna is provided having two transmitting and receiving horns displaced equal distances on opposite sides of the axis of focus or boresight of the antenna. The signals received by the two antenna horns are applied to two channels of a receiver, and in one of these channels the two signals are added and in the other of the channels the two signals are subtracted from one another. The addition and subtraction signals thus produced are thereafter subtracted from one another to produce a final signal which is indicative of targets lying substantially only within an angle of approximately 2° along the boresight of the antenna.

The utilization of the above mentioned system renders the antenna substantially non-responsive to signals lying outside of a region defined by the region of overlap of the radiation patterns of the two horns and when the radiation pattern conforms to that set forth above, the region of overlap of the patterns is quite narrow.

Although the system described above is effective in reducing the effective width of the radiation pattern received by the antenna to approximately 2°, the increasing utilization of radar in new areas and for new purposes demands that the effective width of the beam be still further reduced.

It is an object of the present invention to provide a receiver system for limiting the effective width of the beam received by a radar antenna to an angle of approximately 0.2°.

It is another object of the present invention to provide a system utilizing monopulse resolution improvement techniques and for modifying the aforesaid system so that the difference signal is more nearly equal to the sum signal at all times except when the signal is indicative of a target lying along the boresight of the antenna.

In accordance with the present invention, the difference signal is modified so that it more nearly equals the sum signal for targets lying at all locations except along the boresight of the antenna. The system includes a radar or other transmitting and receiving antenna, preferably of the "orange-peel" type, provided with two radiating horns disposed on opposite sides of and equidistant from the boresight of the antenna. The two horns lie in a plane which is parallel to the direction in which it is desired to limit the effective width of the beam. The signals developed by the horns in response to the electromagnetic waves reflected from a target are added to one another to produce a sum signal in a first channel of the apparatus. These signals are also applied to a second channel of the apparatus and utilized to provide a signal which is representative of the difference between the signals developed by the two antenna horns. In this second channel, however, the two signals are applied to amplifiers having crossed instantaneous automatic gain controls. More particularly, the gain of a first amplifier for amplifying one of the two signals from the antenna horns is controlled in accordance with the amplitude of the signal developed by a second amplifier for amplifying the other of the two signals from the antenna horns. The gain of the second amplifier is, in turn, controlled by an amount proportional to the amplitude of the signal appearing in the first amplifier.

The signal representing the difference between the two signals developed by the horns rises rapidly in amplitude as the target deviates from the boresight so that subtraction of these signals from the sum signal reduces the effective width of the beam to about 0.2° or better, depending upon the specific system in which the apparatus is employed. In consequence, it is apparent that the system of the invention reduces the effective width of the antenna beam below that which was obtainable with the prior art monopulse resolution improvement techniques by a factor of 10 or more.

The beam width reduction system of the present invention may be employed with various types of radiation patterns, although it is disclosed for purposes of illustration and example only, as applied to a system in which the radiation and reception pattern of each of the horns is defined by the relation $\csc^2 \theta \cos \theta$.

In order to obtain substantially instantaneous gain control, the circuit of the invention takes advantage of the delay in signals passing through one or more stages of amplification. More specifically, each of the amplifier channels in the difference channel has a number of cascaded stages and the AGC circuits are coupled between stages of the two amplifier channels which are removed from one another along their respective cascaded stages by a number of stages equal to the number of stages of amplification in the AGC circuit. For instance, if the AGC circuit employs a single amplifier stage, then the AGC circuit is coupled between the first stage in one of the amplifier channels and the second stage in the other amplifier channel. In this manner the delay in the AGC circuit is equal to the delay in the amplifiers and spurious signals resulting from unequal phase delays are not introduced into the system.

It is another object of the present invention to provide a system utilizing monopulse resolution techniques in which the signal reprsenting the difference between two signals received by the separate horns of the antenna is increased in magnitude over that which would be developed by the prior art resolution systems.

It is yet another object of the present invention to provide a system for reducing the effective width of an antenna beam employing monopulse resolution techniques and wherein the signals applied to the difference taking channel of the aforesaid system are applied to amplifiers having crossed instantaneous automatic gain control circuits which control the gain of each of the amplifiers in accordance with the signal in the other of the amplifiers.

Still another object of the present invention is to provide a receiving system employing monopulse resolution improvement techniques having crossed instantaneous automatic gain control circuits coupled between the amplifiers of the two signals in the difference channel and wherein the delay in the AGC circuits are matched to the delay in the stages of the amplifiers.

Other objects and advantages of the present invention will become readily apparent as the following description of the preferred embodiment unfolds and when taken in conjunction with the drawings, in which:

FIG. 4 is a schematic block diagram of a circuit incorporating the principles of the present invention;

Figure 1:
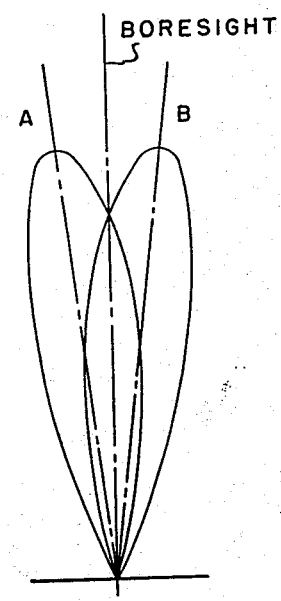
FIG. 1 is a polar coordinate diagram of the power distribution pattern generated and received by the two horns of the antenna employed in the system of the invention.

Referring specifically to FIGS. 1 and 4 of the accompanying drawings, an "orange-peel" antenna, generally designated by the reference numeral 1, is provided with two horns 2 and 3 located equal distances above and below, respectively, the boresight of the antenna which is designated by the line 4. The antenna unit is such that each horn produces a radiation pattern as indicated by the pattern A or the pattern B, as illustrated in FIG. 1. The horn 2 produces the pattern A, and the horn 3 produces the pattern B. The two horns 2 and 3 radiate equal power with an in-phase wave front and produce a total energy pattern as illustrated by the sum pattern $(A+B)$ in FIG. 2 of the accompanying drawings. The $(A+B)$ pattern and the signal representative thereof are hereinafter referred to as the C pattern or signal, respectively.

Figure 2:
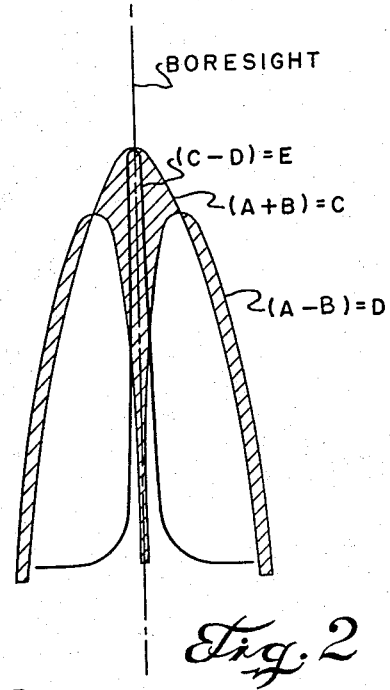
FIG. 2 is a plot of the power distribution patterns of the signals received at the horns of an antenna as resolved by the circuitry employed in a conventional nonopulse resolution technique system.

The reception pattern for the two horns 2 and 3 of the antenna 1 are substantially the same as the transmission patterns and therefore the patterns A and B of FIG. 1 also represent the reception patterns of the horns 2 and 3. In accordance with conventional monopulse resolution improvement techniques, the power signals received by the two horns A and B are added in one channel to produce the sum pattern C as illustrated in FIG. 2, and are subtracted from one another in a second channel to produce the $(A-B)$ pattern of FIG. 2, hereinafter referred to as the difference pattern D. When the difference pattern D is subtracted from the sum pattern C, the difference between the two is represented by the vertical distance between the C and D patterns shown as shaded areas in FIG. 2. The power differences represented by this shaded area are plotted in FIG. 2 as the resolved power pattern E showing the power distribution as a function of angle off the boresight of the antenna. The resolved pattern E then defines the effective beam resolution of the system. Although the width of the pattern E has been exaggerated in the figure for the purposes of illustration only, the effective width of the beam at the −3 db points is, in fact, only about 2°.

The circuit of the present invention for producing improved monopulse resolution of the antenna beam is illustrated in FIG. 4 of the accompanying drawings. Referring now specifically to FIG. 4 which illustrates only the receiving portion of a radar system, the horn 3 is connected via an amplifier 4 to a mixer circuit 6 supplied with local oscillations from a local oscillator 7. The intermediate frequency output signals produced by the mixer 6 are applied through an IF amplifier 8 to an amplitude detector 9. The output signals produced by the amplitude detector 9 are fed to one input circuit of a summing amplifier 11. The horn 2 is coupled through amplifier 12 to a mixer circuit 13 which also receives local oscillation signals from the local oscillator 7. The intermediate frequency signals produced by the mixer 13 are applied through an IF amplifier 14 to an amplitude detector 16. The output signals produced by the amplitude detector 16 are applied to a second input circuit of the summing amplifier 11. The output signals from the mixer 13 are also applied through an IF amplifier 17 to an amplitude detector 18 and the output signals of the detector 18 are applied to a difference amplifier 19. The output signals of the mixer 6 are applied through an IF amplifier 21 to an amplitude detector 22 and the output signals of the amplitude detector 22 are applied to a second input circuit of the difference amplifier 19.

The signals appearing at the output circuit of the summing amplifier 11 vary as a target moves across the boresight of the antenna 1 as indicated by the curve C of FIG. 2, while the output signals produced by the difference amplifier 19 vary as a target moves across the boresight of the antenna 1 in accordance with the curve D of FIG. 2. The output signals from the summation amplifier 11 and difference amplifier 19 are applied to two different input circuits, respectively, of a further difference amplifier 23. The output signals from the difference amplifier 23, which appear on the output lead 24 vary as a target moves across the boresight of the antenna 1 (FIG. 4), in accordance with the resolved pattern E, as illustrated in FIG. 2 of the accompanying drawings. It is apparent that when a target lies along the boresight of the antenna 1, the $A-B$ difference signal from difference amplifier 19 is substantially zero since the curves A and B of FIG. 1 intersect at this point. Therefore, when the target is at this point, the output signal of the summing amplifier 11, represented by the curve C, FIG. 2, is substantially undiminished by the difference amplifier 23. However, as the target moves to one side or another of the boresight, the difference between the patterns A and B increases quite rapidly and the difference E between the sum signal C and the difference signal D becomes increasingly smaller at a very rapid rate. Therefore, the resolved pattern E has very sharply sloping sides and the effective width of the beam of the antenna is reduced to a quite small value, sometimes as small as 2°. The shaded areas at the extreme edges between the C and D patterns, as well as the regions immediately above the upper extremities of the curve D, have relatively short vertical heights and represent signals of small amplitude which may be readily eliminated by amplitude discrimination.

Some applications of radar require beam widths considerably less than the 2° widths produced by the system described above, and in accordance with the present invention an effective antenna pattern is produced which is 0.2° at its half power points.

Referring again to FIG. 4 of the accompanying drawings, and in accordance with the present invention, instantaneous automatic gain control circuits are connected between the intermediate frequency amplifiers 17 and 21 in the channel which derives the signal D. More particularly, the signals in the IF amplifier 17 are sensed by an instantaneous automatic gain control circuit 25 which varies the gain of the IF amplifier 21 in accordance with the amplitude of the signals in the amplifier 17. Similarly, an instantaneous automatic gain control circuit 26 senses the amplitude of the signals in the IF amplifier 21 and controls the gain of the IF amplifier 17 in accordance therewith. The purpose for employing the instantaneous automatic gain control circuits 25 and 26 is to increase and reshape the difference signal D relative to the sum signal C in order to cause the former signal to more nearly equal the latter signal except when the A and B signals are substantially equal and the target lies along the boresight of the antenna. It should be noted that the automatic gain control circuits do not form a ring or closed loop circuit, a ring circuit being one in which the variation in signal level produced by one AGC circuit is reflected through the other AGC circuit to the input circuit of the former AGC circuit. A ring circuit would cause the amplitude of the signals to assume arbitrary values determined wholly by the parameters of the AGC and the amplifier circuits whereas, as previously indicated, the signals produced by the amplifiers 17 and 21 must be related to the amplitude of the sum signal C.

Figure 3:
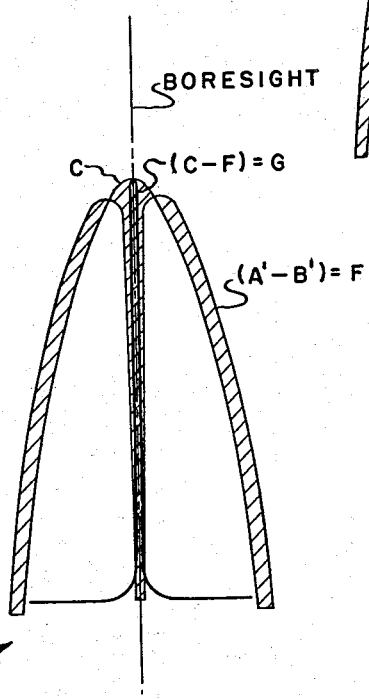
FIG. 3 is a graph of the power distribution patterns of the signals received at the horns of an antenna as resolved by the circuitry of the present invention.
Figure 5:
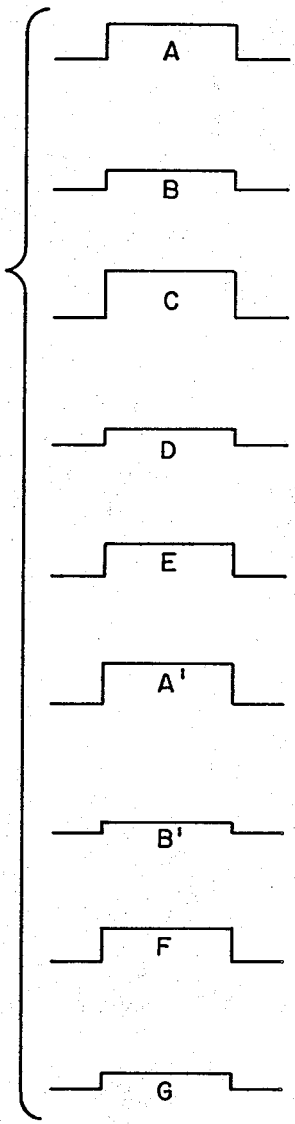
FIG. 5 is a graph illustrating the respective amplitudes of the signals at various locations in the circuit of FIG. 4.

Referring now to FIG. 5 of the accompanying drawings there is illustrated a series of square waves representing the instantaneous relative amplitudes of the various signals which may be produced in the system under an arbitrarily chosen set of circumstances. In the illustrated example the target is displaced below the boresight of antenna 1 and the A signal is larger than the B signal by an amount proportional to the displacement. The signal E representing the difference between the C and D signals is still relatively large although it is less than A which would be the signal level in the absence of the prior art monopulse resolution improvement techniques. By applying the crossed AGC circuits of the invention, the A signal is increased and the B signal is decreased to amplitudes A' and B', respectively. In order that the amplitude of the A'−B' difference signal, which will be designated F, shall conform closely to the amplitude of the signal C, except when the target is along the boresight, the gain control circuits 25 and 26 are adjusted so that the sum of the signals A' and B' is approximately equal to the A+B sum signal C. In this way the difference signal F cannot greatly exceed the sum signal C which, if permitted to occur, might produce high amplitude side lobe signals. The difference signal F (FIG. 3) is considerably larger than the difference signal D (FIG. 2) and therefore the final resolved pattern G resulting from the system of the present invention is appreciably narrower than the resolved pattern E resulting from prior art systems and, thus, represents a considerable improvement in effective beam resolution. The resolved pattern G represents the power difference between the sum pattern C and the difference pattern F, i.e. the shaded area of FIG. 3 as a function of the angle off the boresight of the antenna. For purposes of illustration, the width of the resolved pattern G has been exaggerated in FIG. 3. Nevertheless, the effective width at the −3 db points of the beam represented by the resolved pattern G may be, in fact, as little as 0.2°.

When a target is along the boresight 54 of the antenna the signals A and B are of the same amplitude to the amplifiers 17 and 21 and are amplified in these circuits the same as if crossed AGC were not employed. However, a slight displacement of target results in the AGC circuits 25 and 26 exercising control over the system in order to improve beam resolution.

As previously stated, the variation of signals A and B to obtain signals A' and B' must be controlled so that these signals bear a prescribed relation to the original signals. Also in order for the AGC to be instantaneous phase lags must be substantially eliminated.

Figure 6:
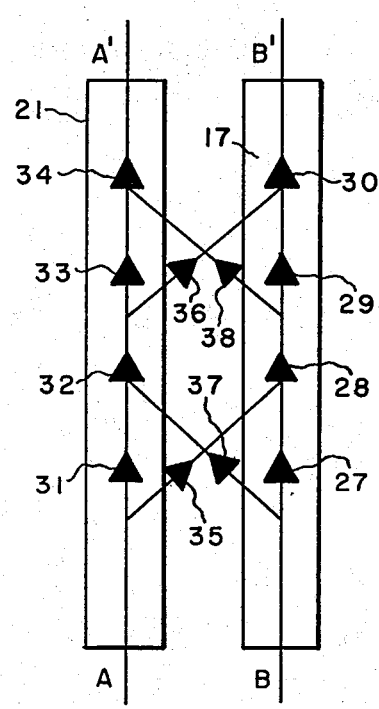
FIG. 6 is a schematic block diagram of the interrelationship between the AGC and the amplifier circuits.

Referring now to FIG. 6 of the accompanying drawings, there is illustrated a gain control system which may be employed to accomplish these aims. The amplifier 17 comprises a plurality of cascaded amplifier stages 27 through 30 while the amplifier 21 comprises cascaded stages 31 through 34. Four single stage AGC circuits 35 through 38 are employed with the circuits 35 and 36 controlling the gain of the amplifier 17 and the circuits 37 and 38 controlling the gain of amplifier 21. In order to substantially eliminate the effects of signal delay through each of the AGC circuits 35 through 38, each circuit is coupled between stages of amplifiers 17 and 21 separated along the cascaded circuit by a number of amplifier stages equal to the number of stages in each AGC circuit. It is assumed, for purposes of example only, that each AGC circuit includes only a single stage and therefore the AGC circuit 35 may be coupled between the input of the first stage, stage 31, of amplifier 21 and the input of the second stage, stage 28, of amplifier 17. Correspondingly, the AGC circuit 37 is coupled between the input of the first stage, stage 27, and the input of the second stage, stage 32, of amplifiers 17 and 21, respectively. In consequence of the aforesaid arrangement the delay suffered by the control signal in passing through circuit 35 is substantially equal to the delay of signal B in passing through stage 27 of amplifier 17. Therefore, the instantaneous control applied to the stage 32 results from a signal which appears at the input to amplifier 17 at the same instant that the signal being operated upon appeared at the input to the amplifier 21.

Gain control is effected by utilizing multiple gain control circuits operating on several stages of each amplifier. Specifically, the circuits 35 and 36 control the gain of stages 28 and 30 of amplifier 17 and the circuits 37 and 38 control the gain of the stages 32 and 34 of amplifier 21. Any number of AGC circuits may be employed to obtain the desired results, the number of circuits required being determined by the gain of each circuit and the total control to be effected.

In operation, and assuming that the A signal increases while the B signal decreases in amplitude, the gain of stage 28 of amplifier 17 is decreased while the gain of stage 32 of amplifier 21 is increased. The increase in the amplitude of the A signal plus the increase in the gain of stage 32 results in a reduction of the gain of stage 30 of amplifier 17 by an even greater amount than the reduction in gain of the stage 28. The gain control is such that the gain of the amplifier receiving the larger signal is increased and the gain of the amplifier receiving the smaller signal is reduced. When a target lies along the boresight of the antenna, the two signals are of equal amplitude and therefore the gains of the two channels are equal, and under these conditions the difference signal F is equal to zero. However, small deviations of the target from the boresight of the antenna bring the crossed instantaneous automatic gain controls into effect so that the amplitude of the difference signal F rises sharply as a function of deviation of target from boresight.

The amplitude of the signal produced by the difference channel must be related to the sum signal in order to prevent the formation of large amplitude side lobes, and specifically the difference signal F should be approximately equal to the sum signal C except, of course, when the target lies along the boresight. In order to meet the above conditions, the parameters of the AGC and amplifier circuits are chosen such that the sum of the two signals in the difference channel, after modification by the crossed AGC circuits, is approximately equal to the signal produced by the sum channel. If these conditions are met, side lobes are maintained at an acceptable level.

The variation in gain of all controlled stages of each amplifier is a function of the level of the signal applied to the other amplifier but the gain variation of the stages of an amplifier, other than the second stage, is also a function of the change in amplitude of the signal applied to that amplifier. Therefore, an open loop system is established and by the proper selection of circuit parameters, the gain of the amplifiers 17 and 21 can be made to be a linear or a non-linear function of signal amplitude selectable at will. The only limitation placed upon the system is that the amplitude of the sum of the signals A' and B' should be closely related to the sum of the signals A and B so that the signal F cannot attain an unreasonably large amplitude relative to the signal C. If the difference signal F were allowed to exceed appreciably the sum signal C, the beam G would be sharpened still further but high energy side lobes would be produced and would introduce complications into the system.

The system illustrated in FIG. 4 is employed to reduce the vertical solid angle of the antenna pattern but it is obvious that the system may be employed to limit the horizontal solid angle of the antenna pattern by merely rotating the horns through an angle of 90° about the boresight. Further, by employing four horns, both horizontal and vertical reduction of the effective width of the antenna beam may be effected. In such a case the four horns are placed at the four corners of a square and to provide a reduction in the effective vertical width of the beam, the two upper horns are treated as one unit and the two lower horns are treated as a second unit. Similarly, to effect horizontal reduction in the width of the beam, two horns lying vertically one above the other are treated as a common unit and the other two horns which are vertically arranged are treated as a single unit. Thus, the techniques of the invention may be applied to both horizontal or vertical or horizontal and vertical beam width reduction.

The above description constitutes a specific embodiment of the invention and many modifications thereof can be made without departing from the spirit and scope of the invention as defined by the appended claims.

What is claimed is:

1. In combination with a multi-horn antenna, an antenna beam sharpening system comprising a first circuit for developing a first input signal proportional to the energy received by one horn of the multi-horn antenna, a second circuit for developing a second input signal proportional to the energy received by another horn of the multi-horn antenna, a first channel having summing means responsive to said input signals for producing a sum signal proportional to the sum of said input signals, a second channel also responsive to said input signals and having an amplifying means for producing an amplified output signal for each of said input signals, means for applying each of said input signals to a different one of said amplifying means, means for increasing and decreasing the gain of each said amplifying means as the input signals applied to the other of said amplifying means decrease and increase respectively, subtracting means for generating a difference signal proportional to the difference between the output signals from said amplifying means, and means for generating a signal proportional to the difference between said sum and difference signals.

2. In combination with a multi-horn antenna, an antenna beam sharpening system comprising a first circuit for developing a first signal proportional to the energy received by one horn of the multi-horn antenna, a second circuit for developing a second signal proportional to the energy received by another horn of the multi-horn antenna a first channel having summing means responsive to said first and second signals for producing a sum signal proportional to the sum of said signals, a second channel having a first amplifier responsive to said first signal for producing a first output signal, and a second amplier responsive to said second input signal for producing a second output signal, means for increasing and decreasing the gain of said first and second amplifiers in accordance with decreases and increases respectively in the amplitude of the signals applied to said second and first amplifiers, means for prducing a difference signal proportional to the difference between said output signals generated by said amplifiers, and means responsive to said sum and difference signals for producing a signal proportional to the difference between said sum and difference signals.

3. In combination with a multi-horn antenna, an antenna beam sharpening system comprising a first circuit for developing a first input signal proportional to the energy received by one horn of the multi-horn antenna, a second circuit for developing a second input signal proportional to the energy received by another horn of the multi-horn antenna, a first channel having means responsive to said first and second input signals for producing a sum signal proportional to the sum of said input signals, a second channel having a first and a second multi-stage amplifier responsive respectively to said first and second input signals, for providing corresponding first and second output signals, two groups of gain control circuits, each of said groups of gain control circuits sensing the signal amplitude in a different predetermined stage of a different one of said amplifiers and increasing and decreasing the gain of different stages of the other of said amplifiers in proportion to the decrease and increase, respectively, of the amplitude of the signals sensed thereby, said gain control circuits altering the gain of stages of said amplifiers succeeding the stages in which the signals are sensed, means for producing a difference signal proportional to the difference between the output signals generated by said amplifiers, and means for producing a signal proportional to the difference between said sum and difference signals.

4. An antenna system comprising an antenna having at least two energy-receiving horns spaced equally from the boresight of said antenna and on opposite sides thereof, means for producing first and second input signals proportional to the energy received by said horns, a first channel having means for producing a sum signal proportional to the sum of said first and second input signals, a second channel having two amplifying means each responsive respectively to one of said input signals for producing two corresponding output signals, means for increasing and decreasing the gain each of said amplifying means as the input signal applied to the other of said amplifying means decrease and increase respectively, means for generating a difference signal proportional to the difference between the output signals from said amplifying means, and means for generating a signal proportional to the difference between said sum and difference signals.

5. In combination with a multi-horn antenna, an antenna beam sharpening system comprising a first circuit for developing a first input signal proportional to the energy received by one horn of the multi-horn antenna, a second circuit for developing a second input signal proportional to the energy received by another horn of the multi-horn antenna, a first channel having summing means responsive to said input signals for producing a sum signal proportional to the sum of said input signals, a second channel including a subtraction means responsive to said input signals for producing a difference signal proportional to the difference between said input signals, coupling means responsive to said input signals for controlling the application of said input signals to said subtraction means, said coupling means comprising circuit means for increasing the amplitude of the larger of said input signals by a greater factor than the amplitude of the smaller of said input signals, and means for producing a signal proportional to the difference between said sum and said difference signals.

6. In combination with a multi-horn antenna, an antenna beam sharpening system comprising a first circuit for developing a first input signal proportional to the energy received by one horn of the multi-horn antenna, a second circuit for developing a second input signal proportional to the energy received by another horn of the multi-horn antenna, a first channel having summing means responsive to said input signals for producing a sum signal proportional to the sum of said input signals, a second channel having subtraction means responsive to said input signals for producing a different signal proportional to the difference between said two input signals, coupling means responsive to said first and second input signals for controlling the application of said first and second input signals to said subtraction means, said coupling means comprising circuit means for amplifying the larger of the two input signals by a greater factor than the smaller of the two input signals, and means for producing a signal proportional to the difference between said sum signal and said difference signal.

7. In combination with a multi-horn antenna, an antenna beam sharpening system comprising a first circuit for developing a first input signal proportional to the energy received by one horn of the multi-horn antenna, a second circuit for developing a second input signal proportional to the energy received by another horn of the multi-horn antenna, a first channel having summing means responsive to said input signals for producing a sum signal proportional to the sum of said input signals, a second channel having subtraction means responsive to said input signals for producing a difference signal proportional to the difference between said two input signals, said second channel also having coupling means responsive to said input signals for controlling the application of said first and second input signals to said subtraction means, said coupling means comprising circuit means for amplifying the larger of the two input signals by a greater factor than the smaller of the two input signals, the amplification of each of the two signals being inversely related to the amplitude of the other signal, said amplification being such that the sum of the two signals applied to said subtraction means is approximately equal to the amplitude of said sum signal except when said two input signals are equal, and means responsive to said sum and said difference signals for producing a signal proportional to the difference between said sum signal and said difference signal.

8. In combination with a multi-horn antenna, an antenna beam sharpening system comprising a first circuit for developing a first input signal proportional to the energy received by one horn of the multi-horn antenna, a second circuit for developing a second input signal proportional to the energy received by another horn of the multi-horn antenna, a first channel having summing means for producing a sum signal proportional to the sum of said input signals, a second channel having an amplifying means responsive to each of said input signals for producing corresponding output signals, means for applying each of said input signals to a different one of said amplifying means, means for increasing and decreasing the gain of each one of said amplifying means as the input signal applied to the other of said amplifying means decreases and increases respectively, the sum of the output signals from said amplifying means being approximately equal to said sum signal except when said input signals are of equal amplitude, means responsive to said corresponding output signals for generating a difference signal proportional to the difference between the output signals from said amplifying means, and means responsive to said sum and said difference signals for generating a signal proportional to the difference between said sum and difference signals.

9. In combination with a multi-horn antenna, an antenna beam sharpening system comprising a first circuit for developing a first input signal proportional to the energy received by one horn of the multi-horn antenna, a receiver circuit for developing a second input signal proportional to the energy received by another horn of the multi-horn antenna, a first channel having means responsive to each of said input signals for producing a sum signal proportional to the sum of said input signals, a second channel having a first and a second multi-stage amplifier responsive respectively to said first and second input signals for producing corresponding output signals, each of said amplifiers having a preceding and a succeeding stage, a pair of gain control circuits, means coupling a gain control circuit between said preceding stage of each of said amplifiers and said succeeding stage of the other of said amplifiers, the signal time delay between said preceding and succeeding stages being approximately equal to the signal time delay through said gain control circuits, said gain control circuits decreasing the gain of a succeeding stage upon an increase in amplitude of the signal in a preceding stage, means responsive to said corresponding output signals for producing a difference signal proportional to the difference between the output signals produced by said multi-stage amplifiers, and means for producing a signal proportional to the difference between said sum and difference signals.

10. The combination in accordance with claim 9 wherein said multi-stage amplifiers include a plurality of preceding and succeeding stages and a gain control circuit coupled between each of said preceding stages of each amplifier and said succeeding stages of the other of said amplifiers.

References Cited in the file of this patent

UNITED STATES PATENTS

| | | |
|---|---|---|
| 2,026,254 | Sandfort | Dec. 31, 1935 |
| 2,438,526 | Waterman | Mar. 30, 1948 |
| 2,456,666 | Agate | Dec. 21, 1948 |
| 2,509,207 | Busignies | May 30, 1950 |
| 2,817,835 | Worthington | Dec. 24, 1957 |
| 2,830,288 | Dicke | Apr. 8, 1958 |